Sept. 10, 1940.   A. C. FUHRMAN   2,214,457
DUAL WHEEL ASSEMBLY
Filed Oct. 21, 1936   3 Sheets-Sheet 2

INVENTOR
Albert C. Fuhrman
BY
Morgan Finnegan Durham
ATTORNEYS

Sept. 10, 1940.   A. C. FUHRMAN   2,214,457
DUAL WHEEL ASSEMBLY
Filed Oct. 21, 1936    3 Sheets—Sheet 3
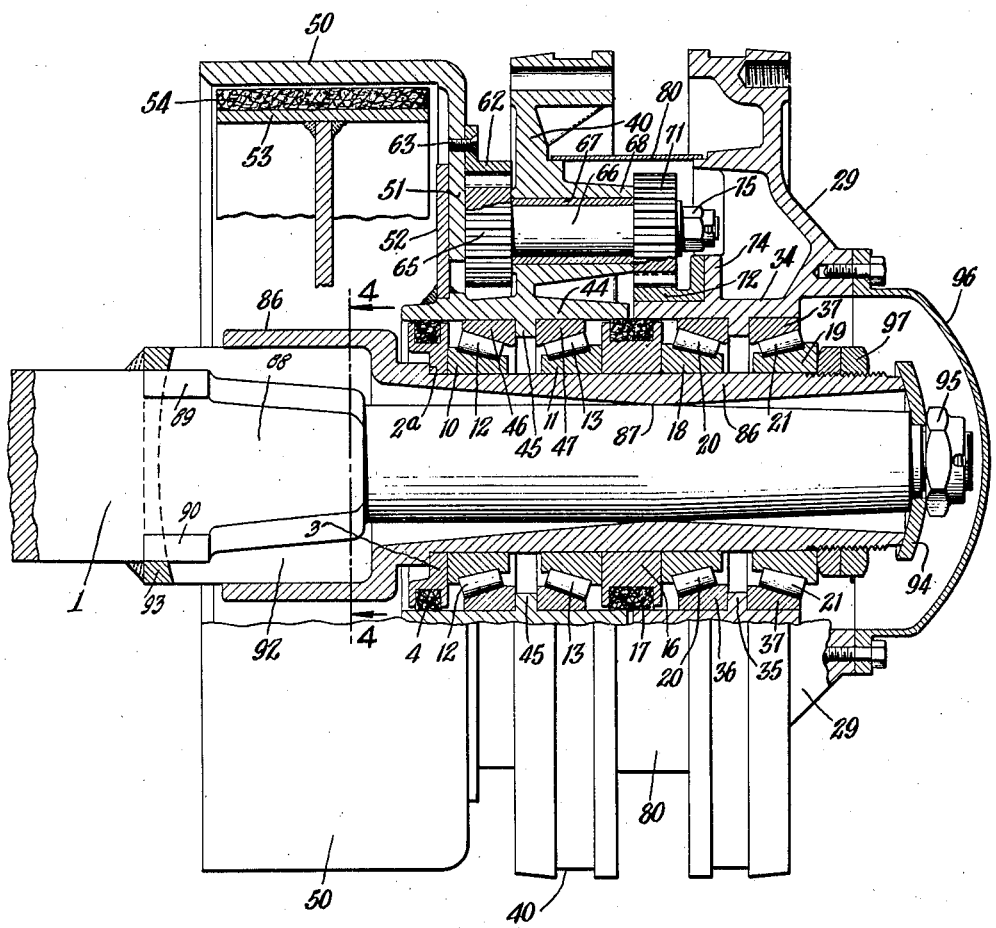
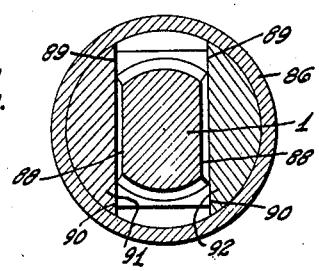

Patented Sept. 10, 1940

2,214,457

UNITED STATES PATENT OFFICE 2,214,457

DUAL WHEEL ASSEMBLY

Albert C. Fuhrman, Canton, Ohio

Application October 21, 1936, Serial No. 106,712

3 Claims. (Cl. 301—135)

The invention relates to new and useful improvements in dual wheel assemblies for vehicles and more particularly to such improvements in the mounting and brake control mechanism for dual wheel mechanisms especially adapted for heavy duty vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is an elevation partly in section of a modified form of mechanism embodying the invention; and Fig. 4 is a transverse section on line 4—4 of Fig. 3.

Objects of the invention are to provide a dual wheel mechanism of simple, sturdy and economical construction, and capacitated to meet varying road conditions, especially the conditions incident to heavy vehicles, with minimum of tire wear and heating; to provide for relative and variable braking action on the wheels to conform to varying road conditions and to minimize tire wear, to safeguard against skidding and to generally effect an efficient braking action; and to improve the structure and efficiency of multi-wheel units especially for heavy traffic under varying road conditions.

Figure 1:
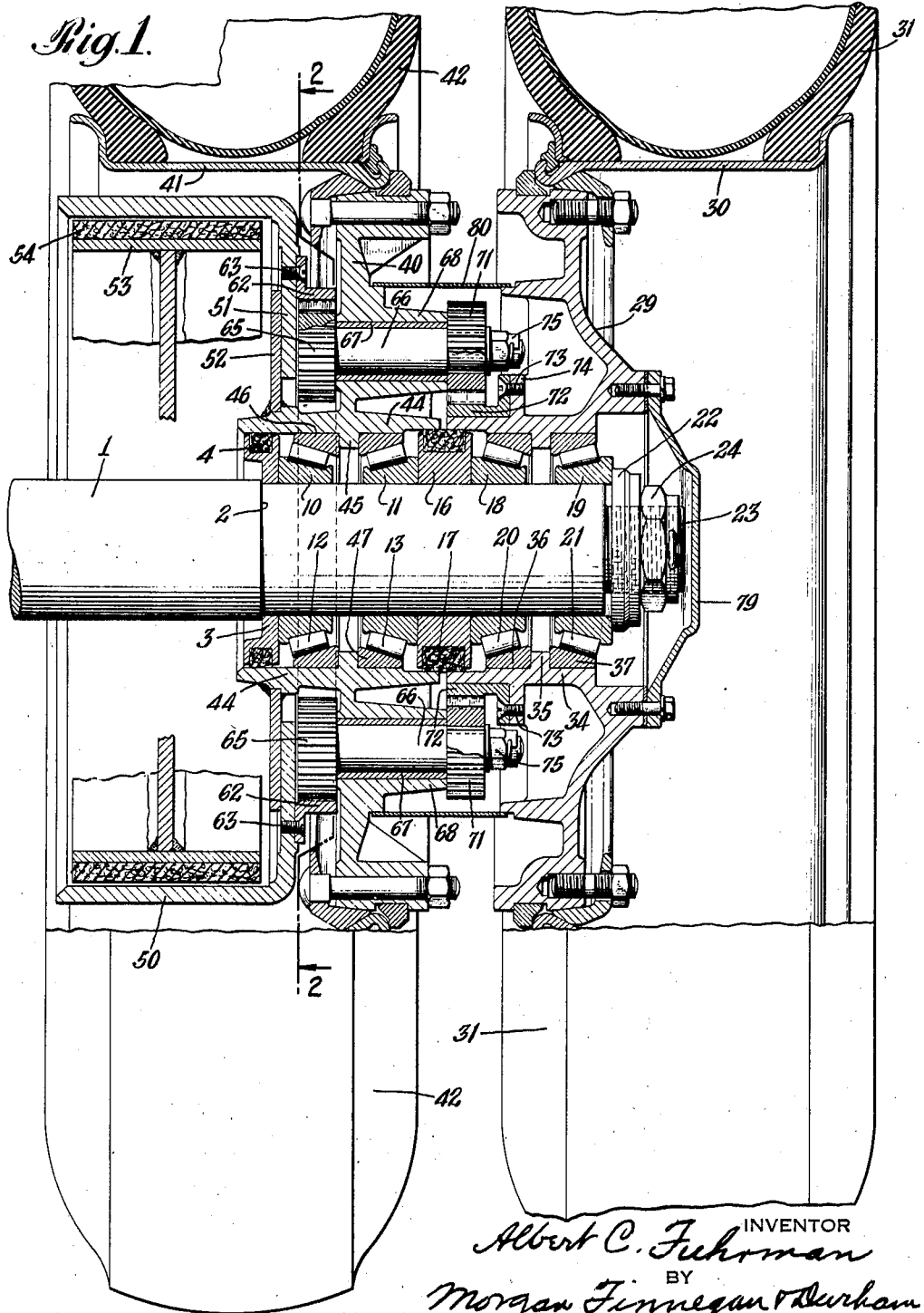
Fig. 1 is an elevation partly in section of a mechanism embodying the invention.
Figure 2:
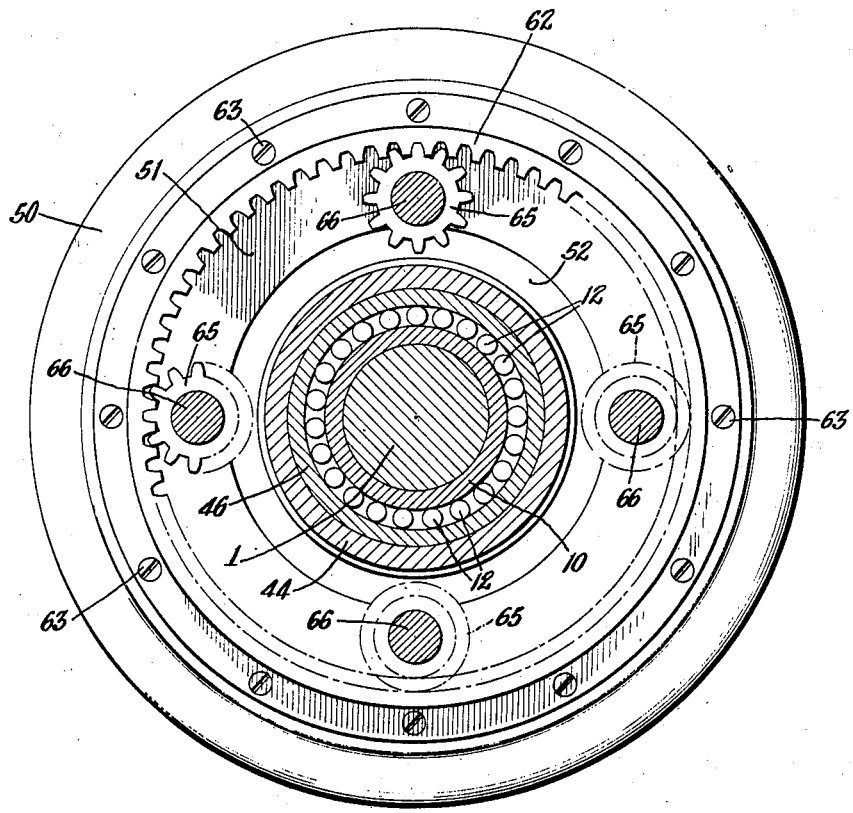
Fig. 2 is a vertical section taken on line 2—2 of Fig. 1, looking in the direction of the arrows.

Referring now in detail to the embodiment of the invention illustrated by way of example in the accompanying drawings, and referring for the present more particularly to Figs. 1 and 2, the vehicle axle is indicated by reference numeral 1, the axle having a shoulder 2 against which the wheel unit is positioned and held. The wheels are each mounted, preferably, upon a double thrust bearing carried upon the axle. As shown, a disc or plate 3 encircles the reduced outer part of the axle 1, and abuts on the shoulder 2, the plate 3 carrying in an annular peripheral groove an oil seal 4. The inner double thrust bearing comprises a pair of inwardly inclined roller race rings 10 and 11 carried on the axle, in which races run the series of rollers 12 and 13. A spacing ring 16 encircles the axle and abuts on the aforesaid bearing on the outside thereof and the outer double thrust bearing abuts on the outer side of the spacing ring 16. An oil seal 17 is carried in a peripheral annular groove in the member 16. Encircling axle 1 and abutting on the outside of the spacing ring 16 are the inwardly and oppositely inclined raceways 18 and 19 of the outer double thrust bearing, the series of rollers 20 and 21 running in the raceways. The embodied means for holding the aforesaid structures on the axle comprises a washer 22 encircling the reduced threaded end 23 of the axle, and a lock nut 24 screw-threaded onto the threaded end 23 and serving to hold the washer 22 against the raceway 19 and to hold the entire structure firmly in position against the shoulder 2 of the axle.

The pair of wheel members are mounted side by side on the two double-thrust roller bearings just described. The outer wheel member comprises the wheel body 29, upon which is mounted a rim 30 and tire 31, and these may be of any known or suitable form, and may be fastened to the wheel member 29 by any suitable means, which need not be further described. The wheel member 29 has integral therewith a hub 34, which encircles the outer double thrust bearing previously described. The hub 34 has within it an inwardly projecting ring 35 on either side of which are the outer raceways 36 and 37, bearing on the two series of rollers 20 and 21. The inner end of hub 34 rests upon the oil seal 17 to form an oil closure at that point.

The inner wheel member 40 is provided with a rim 41 and a tire 42, which likewise may be of any known or suitable form and may be connected to the wheel 40 by any suitable means which need not be described in detail. The wheel 40 has a hub 44 mounted on the inner double thrust bearing previously described, the outer parts of the bore of the hub bearing upon the oil seals 4 and 17 previously described. Hub 44 is provided on its inside with an inwardly projecting ring 45, on either side of which are the outer raceways 46 and 47, which rest upon the two series of rollers 12 and 13.

Suitable braking mechanism is provided and in accordance with certain features of the invention, this mechanism comprises a drum which is freely rotatable relatively to the two wheels of the unit. As embodied, a drum 50 has a flat, centrally-apertured, inwardly-projecting flange 51 and this flange nests within a flat circular plate 52 fixed to (as by a weld) and extending outwardly from the inner end of the hub 44. The brake drum is thus held in position longitudinally of the axle, but is free to rotate with respect to the wheels. Any suitable form of driver-operated means for controlling the rotation of the brake drum 50 may be provided, and a brake band 53 having a lining 54 is shown in fragmentary form.

In the embodied form of connections between the brake drum 50 and the two independently rotatable wheel units, and in accordance with certain features of the invention, a differential gearing is employed. As embodied, an internal gear ring 62 is fastened to the inner face of the drum flange 51 by suitable members such as tap bolts 63. Meshing with the internal gear ring 62 is a pinion 65, fixed on a shaft 66, which shaft is journalled in a sleeve bushing 67, carried in a laterally projecting hub 68 integral with the wheel 44. Fixed also on shaft 66 is a pinion 71, which meshes with a gear ring 72, which ring is fastened by bolts 73 to a projecting ring flange 74 integral with the hub 34 of the outer wheel. A lock nut 75 holds the gear unit together. There are preferably a plurality of the differential gear connections between the brake drum and the wheels, and in Fig. 2 they are shown as four in number. A suitable cap 79 is bolted to the outer face of the wheel 29 and encloses the end of the axle, to constitute a lubricant seal and a finish and protection over the axle end. A ring 80 fits across between the wheel hubs and protects the differential gearing mechanism from grit, water and the like.

In the operation of the illustrated embodiments, the wheels 29 and 40 normally rotate independently on their own bearings and the brake drum 50 rotates only when there is relative rotation between these wheels. Wheel 29 carries a ring gear 72 meshing with planetary pinion 71 which is journalled in the wheel 40 and is fast to planetary pinion 65. Pinion 65 meshes with the internal gear 62 which is fast on the brake drum 50. If the wheels are rotating at the same speed, gears 62, 65, 71 and 72 rotate as a unit but if any relative rotation occurs between the wheels, the pinions 65 and 71 revolve, and this planetary motion causes the brake drum 50 to rotate faster or slower than the wheel 70. When the brake shoes 54 are expanded to retard rotation of the wheels 40 and 29, the brake band 50 is restrained and this force is applied through pinion 65 to the pinion shaft 66 and thereby to the wheel 40, and is also applied to pinion 71 and through ring gear 72 to wheel 29, thereby equally distributing the braking effort between the wheels 29 and 40.

In Fig. 3 of the drawings a structure the same or similar to the foregoing is shown, but in addition this structure has angular movement lengthwise of the axle. The wheel and brake structure as shown in Fig. 3 is substantially the same as that shown in the preceding figures, is indicated by the same numerals, and need not be again described. In this construction the two double thrust bearings are mounted on a skein or sleeve 86, which encircles the outer end of the axle 1, the inner diameter of the skein 86 being decreased inwardly to a central point 87, which is of substantially the same diameter as the exterior small part of the axle and thus permits angular movement of the skein 86 considered lengthwise of the axle. Means are provided for preventing relative rotation between the axle 1 and the skein 86, and a portion of the axle is reduced in thickness as at 88 and is provided with flat bosses or wear surfaces 89 and 90 at the top and bottom portions. Surfaces 89 and 90 are adapted to bear against the internal adjacent flat surfaces of the exteriorly cylindrical filler members 91 and 92 which are fixed within and conform to the inner cylindrical surface of the enlarged end of skein 86. The bosses 89 and 90 on opposite sides of the axle 1 and adjacent the reduced portion 88 hold the members 91 and 92 apart and serve to limit pivotal movement of the skein to a vertical plane, that is, about a horizontal axis. On their inner ends, members 91 and 92 are cylindrically or spherically convex and fit against the correspondingly concave face of wear plate 93 fitted over and welded to the axle beam 1, thus preventing inward movement of the skein 86 and wheel assembly while allowing it free pivotal movement about the horizontal axis. In this form the entire assembly is held to the shoulder 2a (which shoulder on the skein corresponds to the shoulder 2 on the axle) by lock nut 97 screwthreaded on to the axle, and a dished washer 94 is held on the screw-threaded end of the axle 1 by a lock nut 95. A cap 96 is bolted to the outer face of the wheel 29 and serves as a lubricant seal and a finish plate.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheeled assembly for road vehicles comprising an axle, a skein mounted for swinging movement, said skein having oppositely extending internally tapered portions which meet to form a narrow central supporting annulus of a diameter approximately the same as the axle, means for preventing axial movement of the skein and a pair of rotatably mounted wheels on said skein.

2. A dual wheeled assembly for road vehicles comprising an axle, a skein mounted for swinging movement, said skein being internally tapered from each end to form a narrow central supporting annulus of a diameter approximately the same as the axle, means preventing movement of the skein except in a single plane, means for preventing axial movement of the skein and a pair of rotatably mounted wheels on said skein.

3. In a dual wheeled structure, the combination of an axle, a skein carried on the axle end, a pair of relatively rotatable wheels in axial alinement on the skein, a brake drum, pinions carried by the inner wheel, an external gear fast on the center wheel and an internal gear mounted on the brake drum, said gears meshing with the pinions whereby the gears connect the brake drum with both wheels, and said skein having an internally reduced portion fitting close to the axle and whereby the skein and wheels may oscillate upon the axle.

ALBERT C. FUHRMAN.